Patented Sept. 28, 1943

2,330,761

UNITED STATES PATENT OFFICE 2,330,761

CHEMICAL PROCESS

Carl O. Tongberg, Westfield, N. J., assignor to Standard Oil Development Company, a corporation of Delaware No Drawing. Application December 30, 1939
Serial No. 311,933

15 Claims. (Cl. 260—683.5)

The present invention relates to an improved method for isomerizing paraffin hydrocarbons and more specifically to a new class of catalyst activators for such reaction.

It is known that normal paraffin hydrocarbons can be isomerized by means of Friedel-Crafts catalysts, such as aluminum chloride or bromide, zinc chloride, ferric chloride and the like. It is likewise known that the catalyst in almost every case requires an activator, since without such activator its activity diminishes very rapidly. As activators, hydrogen halides, such as hydrogen chloride, have been mainly employed.

It has now been found that the oxides of sulfur, namely, sulfur dioxide and sulfur trioxide, are excellent activators for Friedel-Crafts type catalysts in the isomerization reaction. Since sulfur dioxide is a cheap and readily obtainable material at petroleum refineries, this compound is especially suitable for use as an activator in the isomerization process. Since the isomerization process is normally conducted in the substantial absence of water, no corrosion problem will be involved in the use of an oxide of sulfur as an activator. Even if small amounts of water were present, no corrosion would be expected in the presence of such a catalyst as aluminum chloride, since the latter readily absorbs moisture.

The present process, in which an oxide of sulfur is employed as a catalyst activator, is capable of converting paraffins, in particular normal paraffins, such as normal butane, normal pentane, normal hexane, normal heptane and their homologs, into their corresponding branched iso forms, such as isobutane, isopentane and the like. The feed stock may also comprise mixtures of more than one of these straight chain paraffins, or, if convenient, the paraffinic hydrocarbon mixture may contain small proportions of branched chain paraffins, although for greatest efficiency the hydrocarbon feed stocks should comprise essentially straight chain paraffins. The invention, however, is not limited to the isomerization of straight chain hydrocarbons. It includes also the conversion of branched chain paraffins into isomeric more highly branched hydrocarbons. Mixed paraffins, such as straight run naphthas, may by the present method be converted into isomeric mixtures which have an increased value with respect to anti-detonation qualities when used as motor fuels and with respect to the facility with which they may enter into further chemical reactions to produce alkylation products when reacted with olefins. In general, any hydrocarbon mixture composed predominantly of paraffin hydrocarbons is suitable for use as a feed stock for the process herein outlined. A product containing substantial amounts of branched chain isomers may be separated from the reaction medium and fractionated within the desired boiling range. The constituents boiling above and below the desired boiling range may then be returned to the isomerizing reactor to suppress their further formation or to be further isomerized to more useful products.

The activator, such as sulfur dioxide, may be added to the feed stock, or it may be added to the reaction chamber by independent means so as to be distributed more evenly through the catalyst mass. It is not necessary to add the activator continuously and it may be added from time to time as the catalyst shows deterioration. The amount of the activator varies with the catalyst, its age, the temperature and other conditions, but ordinarily the amount is from 0.5% to 5% or 10% of the feed stock treated.

The conditions for isomerizing with the present catalysts and activator are much the same as those formerly employed with the hydrogen halide activators. A wide temperature range may be employed, for example, from about —50° to about 400° F. The higher temperatures, i. e. from 300° to 400° F., are preferably employed when the feed stocks are in vapor phase, but under these conditions there may be some decomposition at the same time. At the lower temperatures, for example, from —50° to 250° F., isomerization may be effected in the liquid phase and without side reactions. The time of the reaction varies with other factors, such as temperature, the amount of catalyst, the particular catalyst used and the particular feed stock treated. In general, however, the time of reaction may be from ½ to 30 hours, and the conditions are usually adjusted so as to obtain a conversion of 50% to 75%, and a temperature, for example, of 150° to 250° F. for butane and 30° to 100° F. for pentane.

The amount of catalyst to be used varies widely, depending upon the particular hydrocarbon which is to be converted, the amounts ranging from 2% to 150% by weight of the hydrocarbon material present in the reactor. For the conversion of butane in the presence of aluminum chloride it is advantageous to use about 10% to about 50%, preferably about 15%, by weight of aluminum chloride, and 0.5% to about 10%, preferably about 1%, by weight of the oxide of sulfur. The invention is not limited to the use of an oxide of sulfur alone as the activator. For example, a hydrogen halide, such as hydrogen chloride, may be added.

The reaction is preferably carried out under liquid phase conditions. Hence, any temperature below the critical temperature of the feed stock may be employed, although it is preferable to use the temperatures specified above. Sufficient superatmospheric pressure may be employed to maintain the reactants as well as the reaction products in the liquid phase under the reaction conditions obtained. In particular, the liquid phase reactions are conducive to the production of ultimate high yields and to the carrying out of the process in a continuous manner. It is to be understood, however, that the process is not only applicable to continuous operation but it is contemplated to carry the same out in batch type operations. Where the reaction is carried out in the liquid phase it has been found advantageous to intensively agitate the reaction mixture so that intimate contact is established between the feed and the catalyst. The catalyst may be employed as a slurry, in which case a mechanical agitator propelled by external means is preferably inserted in the reactor. Where a batch type of reaction is employed, it is well to employ liquid phase operation and to force the liquid hydrocarbon feed into the reactor under pressure through jets of restricted internal diameter or to employ turbo mixers or some similar dispersion means for increasing intimacy of contact between the catalyst and the feed. The direction of flow of the feed stock may be upward or downward through the catalyst bed; but where a powdered catalyst is used, an upward flow is preferable.

In the case of batch operations, the reaction may be carried out in a bomb or autoclave preferably fitted with agitating apparatus. In continuous flow processes, the normal paraffin is passed in vapor or liquid condition through a reaction vessel containing the catalyst which may be in lump or powdered form or may be supported on a carrier such as silica, alumina gels thereof, activated carbon, asbestos, pumice, clay and the like. The hydrocarbon feed stock may be pumped through a horizontal chamber or vertical bed of the catalyst. The catalyst may also be used in finely divided form and may be passed through the reaction zone suspended in the materials being treated. The catalysts may consist entirely of Friedel-Crafts agents or may be modified by the addition of alkali or alkaline earth halides, such as potassium or sodium chloride or calcium or magnesium halides.

The advantages of the present invention are illustrated by the following examples:

EXAMPLE 1

In the following series of tests under comparable conditions a portion of liquefied normal butane was agitated in a closed reaction vessel at 212° F. in the presence of 15% by weight of aluminum chloride. In some of the tests no activator was present and in others hydrogen chloride or sulfur dioxide was used. The results and details of the proportion of activator present at time of the treatment are indicated in the following table. The results indicate the percentage yield of isobutane, the yields of hydrocarbons lighter and heavier than butane, the total conversion of normal butane and the selectivity as to the formation of isobutane in preference to other products.

*Isomerization of normal butane*

| Test No. | Catalyst | Activator | Temp., °F. | Time, hours | Yields, per cent | | | Per cent conversion | Isobutane selectivity |
|---|---|---|---|---|---|---|---|---|---|
| | | | | | Isobutane | Lighter hydrocarbons | Heavier hydrocarbons | | |
| 1 | 15% AlCl₃ | None | 212 | 12 | 33.7 | | | 35.1 | 96.0 |
| 2 | 15% AlCl₃ | 2% HCl | 212 | 12 | 43.0 | 11.3 | | 54.3 | 79.0 |
| 3 | 15% AlCl₃ | 2% SO₂ | 212 | 12 | 36.7 | 33.9 | 1.2 | 71.8 | 51.2 |
| 4 | 15% AlCl₃ | None | 212 | 6 | 40.4 | 0.2 | Trace | 40.6 | 99.7 |
| 5 | 15% AlCl₃ | 2% HCl | 212 | 6 | 24.0 | 0 | Trace | 24.0 | 100.0 |
| 6 | 15% AlCl₃ | 1% SO₂ | 212 | 6 | 44.8 | 9.3 | Trace | 54.1 | 82.8 |
| 7 | 15% AlCl₃ | 2% SO₂ | 212 | 6 | 43.6 | 14.5 | Trace | 58.1 | 75.0 |

EXAMPLE 2

In a second series of tests a portion of normal butane was agitated in a closed turbo mixer at a temperature of 200° to 210° F. in the presence of about 20% by weight of powdered aluminum chloride for one hour. The butane was introduced and maintained in the liquid phase. In the first test no activator was present, and in the second 1% by weight of sulfur dioxide was used. In the test without activator, a yield of 10% of isobutane was obtained, and the test in the presence of the sulfur dioxide gave a yield of 33% of isobutane.

The present invention is not to be limited by any theory of the reaction mechanism or by any of the examples, which are given by way of illustration only, but solely by the following claims in which it is desired to claim all novelty inherent in the invention.

I claim:

1. An improved process for isomerizing normal paraffin hydrocarbons which comprises subjecting the same to the action of about 10% to about 150% of a Friedel-Crafts type catalyst and a catalyst activator comprising an oxide or sulfur.

2. An improved process for isomerizing normal paraffin hydrocarbons which comprises subjecting the same to the action of a Friedel-Crafts type catalyst in sufficient amount to promote the reaction and a catalyst activator comprising an oxide of sulfur, the amount of said Friedel-Crafts type catalyst being at least 10% by weight of the hydrocarbons present.

3. Process according to claim 1 in which the catalyst is an aluminum halide.

4. Process according to claim 1 in which the activator is sulfur dioxide.

5. Process according to claim 1 in which the catalyst is aluminum chloride and the activator is sulfur dioxide.

6. An improved process for isomerizing normal paraffin hydrocarbons which comprises subjecting the same to the action of about 10% to about 150% of a Friedel-Crafts type catalyst in the presence of a catalyst activator comprising sulfur dioxide while at a temperature of from −50° to 400° F.

7. Process according to claim 6 in which the catalyst is aluminum chloride.

8. An improved process for isomerizing a normal paraffin hydrocarbon which comprises subjecting the same in the liquid phase to the action of about 10% to about 150% of a Friedel-Crafts type catalyst in the presence of a catalyst activator comprising sulfur dioxide while at a temperature of from −50° to 250° F.

9. An improved process for isomerizing normal butane which comprises subjecting the same to the action of about 10% to about 50% of aluminum chloride in the presence of a catalyst activator comprising sulfur dioxide while at a temperature of from 150° to 250° F.

10. Process according to claim 8 in which the catalyst is aluminum chloride.

11. An improved process for isomerizing normal butane which comprises subjecting the same to the action of about 10% to about 50% by weight of aluminum chloride and about 0.5% to about 10% by weight of sulfur dioxide while at a temperature of from 150° to 250° F.

12. An improved process for isomerizing normal butane which comprises subjecting the same in the liquid phase to the action of about 10% to about 50% by weight of aluminum chloride and about 0.5% to about 10% by weight of sulfur dioxide while at a temperature of from 150° to 250° F.

13. An improved process for isomerizing normal butane which comprises subjecting the same in the liquid phase to the action of about 15% by weight of aluminum chloride and 1% by weight of sulfur dioxide while at a temperature of about 212° F.

14. An improved process for isomerizing normal pentane which comprises subjecting the same to the action of about 75% to about 150% of aluminum chloride in the presence of a catalyst activator comprising sulfur dioxide while at a temperature of from 30° to 100° F.

15. An improved process for isomerizing normal pentane which comprises subjecting the same in the liquid phase to the action of about 75% to about 150% by weight of aluminum chloride and about 0.5% to about 10% by weight of sulfur dioxide while at a temperature of from 30° to 100° F.

CARL O. TONGBERG.